J. H. Keller,
Harvester Reel.

No. 94,418. Patented Aug. 31, 1869.

Witnesses
C. W. Anderson.
James P. Graves

Inventor
John H. Keller
Chapman, Hosmer & Co.
attys

UNITED STATES PATENT OFFICE.

JOHN H. KELLER, OF BOALSBURG, PENNSYLVANIA.

REEL FOR REAPING-MACHINES.

Specification forming part of Letters Patent No. 94,418, dated August 31, 1869.

*To all whom it may concern:*

Be it known that I, JOHN HENRY KELLER, of Boalsburg, in the county of Centre and State of Pennsylvania, have invented a new and valuable Improvement in Reel on Reaping-Machines; and do hereby declare that the following is a full, clear, and exact description of the construction and operation of the same, reference being had to the annexed drawings, making a part of this specification, and to the letters and figures of reference marked thereon.

Figure 1:
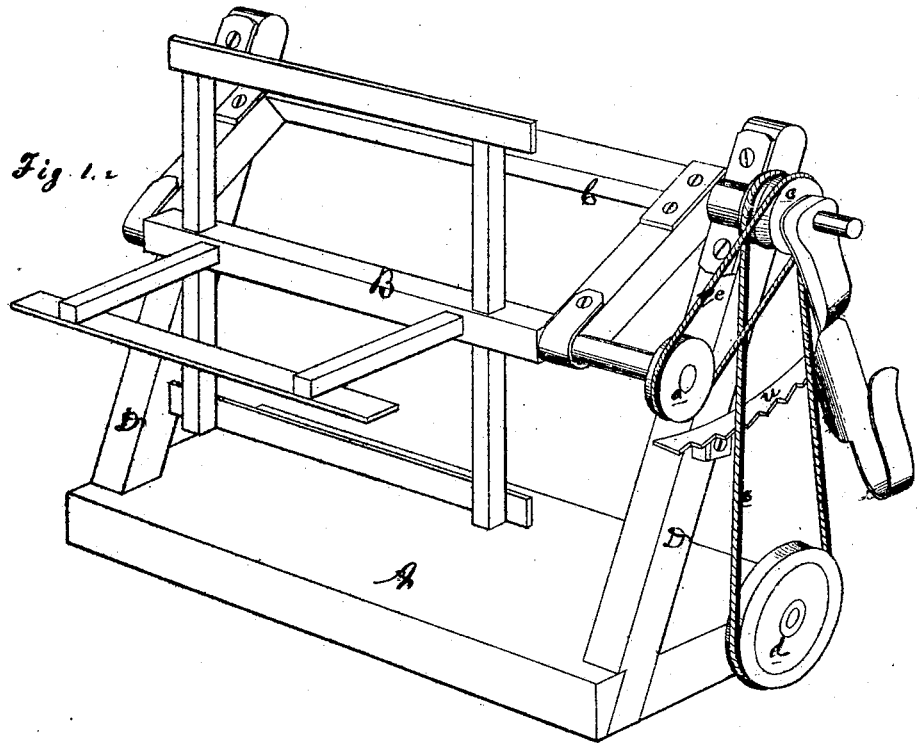
Figure 2:
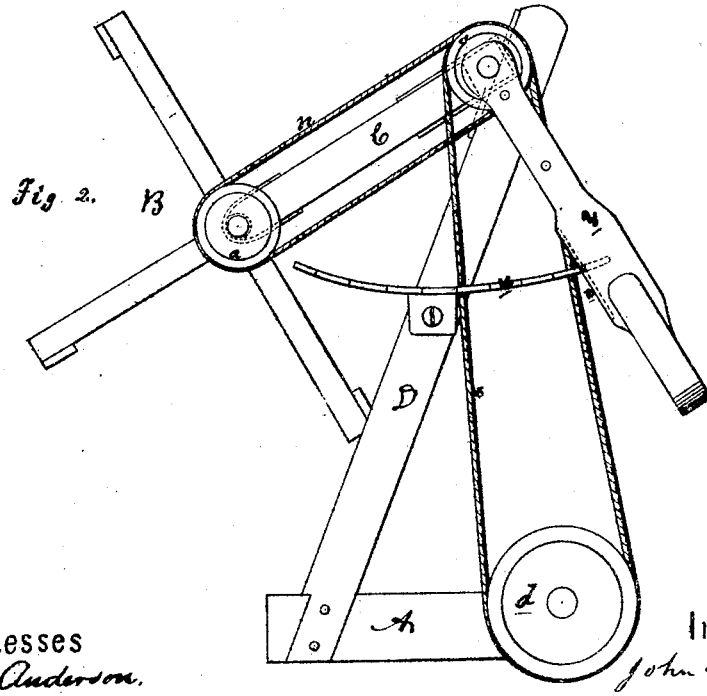

Figure 1 of the drawings is a plan view of my device, and Fig. 2 is an end view thereof.

My invention relates to reaping-machines; and it consists, mainly, in the construction and novel arrangement of means for adjusting the position of the reel of such machines to any desirable altitude, at the operator's will.

The letter A of the drawings represents the platform of a reaper, and letter B the reel thereof.

The letter C represents a swinging frame, hinged to the standards D in the manner shown.

The letter $a$ represents a fast pulley or band-wheel attached to the extended end of the center shaft of the reel, and letter $c$ a band-wheel attached to the extended end of the shaft of frame C, as shown.

The letter $d$ represents a band-wheel applied upon a suitable journal at one end of the platform.

The letter $n$ represents a band connecting wheels $a$ and $c$, and the letter $s$ represents a band connecting wheels $c$ and $d$.

The letter $u$ represents a ratchet-bar, pivoted to a standard, D, in the manner shown. It is made firm at any desired angle, at will, by means of the screw that serves as its pivot.

The letter $y$ represents a lever attached at its upper end firmly to the extended end of the shaft of frame C. Its lower end is formed in the shape of a hook, with a flange, $v$, that fits between the respective teeth of the ratchet-bar. By means of this lever and its flange working in conjunction with ratchet-bar $u$, the operator is enabled to raise or lower the reel at will, and make it secure at the altitude desired.

My device becomes most effective when the reaper is arranged to bring the lever $y$ within reach of the driver's hand. In that case he can raise or lower the reel without stopping the team or leaving his seat, and thereby adapt it, without trouble or delay, to either long or short straw or to grain that is lodged.

What I claim as my invention, and desire to secure by Letters Patent, is—

The reel for reaping-machines herein described, suspended from the swinging frame C, and having band-wheels $a$, $d$, and $c$, bands $n$ and $s$, ratchet-bar $u$, lever $y$, with its flange $v$, and constructed and arranged substantially as specified.

In testimony that I claim the above improvement I have hereunto subscribed my name in the presence of two witnesses.

JOHN H. KELLER.

Witnesses:
 JOHN SHANNON,
 D. F. LUSE.